US007841234B2

(12) United States Patent
Coates et al.

(10) Patent No.: US 7,841,234 B2
(45) Date of Patent: Nov. 30, 2010

(54) SYSTEM AND METHOD FOR SENSING PRESSURE USING AN INDUCTIVE ELEMENT

(75) Inventors: Don M. Coates, Santa Fe, NM (US); David W. Beck, Santa Fe, NM (US); M. Clark Thompson, Los Alamos, NM (US)

(73) Assignee: Chevron U.S.A. Inc., San Ramon, CA (US)

( * ) Notice: Subject to any disclaimer, the term of this patent is extended or adjusted under 35 U.S.C. 154(b) by 125 days.

(21) Appl. No.: 11/882,104

(22) Filed: Jul. 30, 2007

(65) Prior Publication Data
US 2009/0031796 A1 Feb. 5, 2009

(51) Int. Cl.
*E21B 47/06* (2006.01)
(52) U.S. Cl. .................................. 73/152.51
(58) Field of Classification Search ............ 73/152.51; 166/66, 66.5
See application file for complete search history.

(56) References Cited

U.S. PATENT DOCUMENTS

| | | | | |
|---|---|---|---|---|
| 3,320,579 | A | * | 5/1967 | Abbott .................... 367/141 |
| 3,562,741 | A | | 2/1971 | McEvoy et al. ............ 341/15 |
| 4,023,136 | A | | 5/1977 | Lamensdorf et al. |
| 4,160,970 | A | | 7/1979 | Nicolson |
| 4,218,507 | A | * | 8/1980 | Deffeyes et al. ........... 428/328 |
| 4,308,499 | A | | 12/1981 | Thierbach et al. |
| 4,430,577 | A | | 2/1984 | Bouquet .................. 307/108 |
| 4,839,644 | A | | 6/1989 | Safinya et al. |
| 4,845,378 | A | | 7/1989 | Garbe et al. .............. 307/106 |
| 5,150,067 | A | | 9/1992 | McMillan ................. 327/181 |
| 5,355,714 | A | | 10/1994 | Suzuki et al. ............. 73/146.5 |
| 5,423,222 | A | * | 6/1995 | Rudd et al. ............... 73/779 |
| 5,451,873 | A | | 9/1995 | Freedman et al. |
| 5,467,083 | A | | 11/1995 | McDonald et al. |
| 5,576,703 | A | | 11/1996 | MacLeod et al. |
| 5,587,707 | A | | 12/1996 | Dickie et al. |
| 5,680,029 | A | * | 10/1997 | Smits et al. ............... 320/107 |
| 5,686,779 | A | | 11/1997 | Vig |
| H1744 | H | | 8/1998 | Clayton et al. |
| 5,821,129 | A | | 10/1998 | Grimes et al. ............ 436/151 |

(Continued)

FOREIGN PATENT DOCUMENTS

EP 0314654 3/1989

(Continued)

OTHER PUBLICATIONS

International Search Report mailed Oct. 10, 2008 in International Application No. PCT/US08/09161.

(Continued)

*Primary Examiner*—Hezron Williams
*Assistant Examiner*—Tamiko D Bellamy
(74) *Attorney, Agent, or Firm*—Merchant & Gould

(57) ABSTRACT

Exemplary systems and method are directed to a sensing device, and to a pressure sensing system and method. An exemplary method includes supplying electromagnetic energy to a transducer which is configured to reflect the electromagnetic energy at a ring frequency determined by an inductance of the transducer, wherein the inductance changes in response to compression of the inductive element. The ring frequency of electromagnetic energy reflected by the transducer is correlated to a pressure value.

4 Claims, 6 Drawing Sheets

U.S. PATENT DOCUMENTS

| | | |
|---|---|---|
| 5,936,913 A | 8/1999 | Gill et al. |
| 5,942,991 A | 8/1999 | Gaudreau et al. |
| 6,025,725 A | 2/2000 | Gershenfeld et al. |
| 6,234,257 B1 | 5/2001 | Ciglenec et al. |
| 6,393,921 B1 | 5/2002 | Grimes et al. .................. 73/728 |
| 6,434,372 B1 | 8/2002 | Neagley et al. |
| 6,633,236 B2 | 10/2003 | Vinegar et al. |
| 6,670,880 B1 | 12/2003 | Hall et al. |
| 6,766,141 B1 | 7/2004 | Briles et al. |
| 6,993,432 B2 | 1/2006 | Jenkins et al. |
| 7,017,662 B2 | 3/2006 | Schultz et al. |
| 7,114,561 B2 | 10/2006 | Vinegar et al. |
| 7,158,049 B2 | 1/2007 | Hoefel et al. |
| 7,168,487 B2 | 1/2007 | Salamitou et al. |
| 7,180,826 B2 | 2/2007 | Kusko et al. |
| 7,256,707 B2 | 8/2007 | Clark et al. |
| 7,397,388 B2 | 7/2008 | Huang et al. |
| 7,530,737 B2 | 5/2009 | Thompson et al. |
| 7,548,068 B2 | 6/2009 | Rawle et al. |
| 2007/0030762 A1 | 2/2007 | Huang et al. |
| 2007/0107528 A1 | 5/2007 | Schroeder et al. |
| 2007/0206440 A1 | 9/2007 | Fripp et al. |
| 2007/0235184 A1 | 10/2007 | Thompson ............. 166/250.01 |
| 2008/0185328 A1 | 8/2008 | Stefanini |
| 2008/0253230 A1 | 10/2008 | Thompson et al. |
| 2008/0264624 A1 | 10/2008 | Hall et al. |
| 2009/0226263 A1 | 9/2009 | Wetch |

FOREIGN PATENT DOCUMENTS

| | | |
|---|---|---|
| GB | 2 386 691 A | 9/2003 |
| GB | 2 425 593 A | 11/2006 |
| JP | 05267066 A * | 10/1993 |

OTHER PUBLICATIONS

Goswami et al., "On Subsurface Wireless Data Acquisition System," IEEE Trans. On Geosci. And Rem Sensing, vol. 43(10), pp. 2332-2339 (2005).

* cited by examiner

SYSTEM AND METHOD FOR SENSING PRESSURE USING AN INDUCTIVE ELEMENT

BACKGROUND

1. Field

Pressure transducers are disclosed, such as transducers that shift the frequency of a reflected signal based on a response to pressure.

2. Background Information

Devices have been used for monitoring downhole conditions of a drilled well, where environmental conditions can be relatively harsh. These downhole conditions include temperature and pressure, among others.

SUMMARY

An exemplary sensing device is disclosed. The sensing device includes a shaped elastomer and ferromagnetic material embedded as discrete particles within the shaped elastomer, wherein a percentage by weight of the ferromagnetic particles is selected such that an inductance of the shaped elastomer will vary a predetermined amount for a given compression of the shaped elastomer.

An exemplary system for sensing pressure in a borehole is also disclosed. The system comprises means for generating electromagnetic energy, and means for modulating the electromagnetic energy. The modulating means includes an inductive element comprising a shaped elastomer and ferromagnetic material embedded as discrete particles within the shaped elastomer, wherein a percentage by weight of the ferromagnetic particles is selected such that an inductance of the shaped elastomer will vary a predetermined amount for a given compression of the shaped elastomer.

An exemplary method of sensing pressure uses a transducer that includes a compressible inductive element. The method comprises supplying electromagnetic energy to a transducer which is configured to reflect the electromagnetic energy at a ring frequency determined by an inductance of the transducer, wherein the inductance changes in response to compression of the inductive element. The ring frequency of electromagnetic energy reflected by the transducer is correlated to a pressure value.

BRIEF DESCRIPTION OF THE DRAWINGS

Other advantages and features described herein will be more readily apparent to those skilled in the art when reading the following detailed description in connection with the accompanying drawings, wherein.

DETAILED DESCRIPTION

Figure 1:
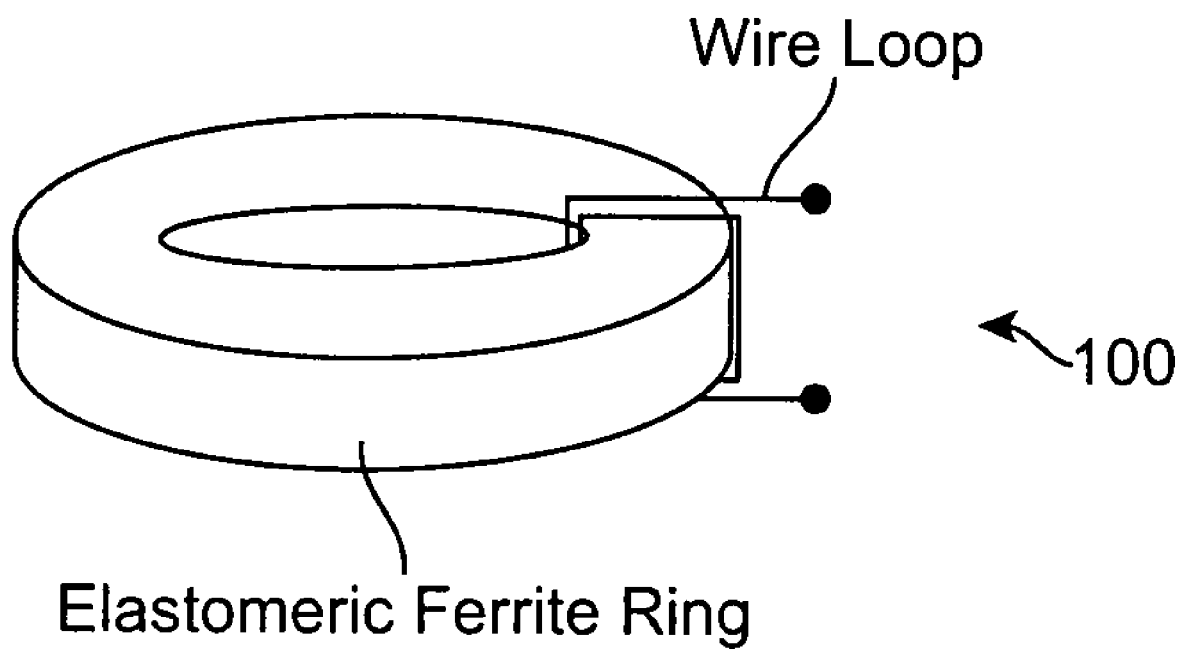
FIG. 1 shows an exemplary inductive sensor for sensing pressure.

FIG. 1 shows an exemplary inductive sensor for sensing pressure. As shown in FIG. 1, the inductive sensor 100 can be configured as a ferrite core in the form of a shaped elastomer that includes ferromagnetic material such that an inductance of the inductive element varies as a function of compression of the shaped elastomer due to a pressure of the surrounding environment. The ferrite core can be formed in the shape of a ring for coupling to production tubing within a drilling well or any other shape suitable for achieving the desired response or performance.

The inductive sensor 100 can be formed of ferromagnetic material that is potted using an elastomeric potting agent, e.g. silicone rubber or any other suitable elastomeric material as desired. The inductive sensor 100 can include a ferromagnetic blend of various ferromagnetic materials (or particles), such as iron oxides, iron powder, or any other suitable materials as desired. The composition by weight of each magnetic material in the ferromagnetic blend determines various parameters of the inductive sensor 100, which can include but are not limited to an impedance value, core loss, frequency response, temperature response, quality (Q) factor, power handling, and any other controllable parameters or characteristics. Due to the physical properties of the ferromagnetic blend, the inductive sensor 100 can be compressed by an external force, e.g., pressure, such that an inductive value of the sensor 100 will vary in response to the external force. Those of skill in the art will recognize that a ferromagnetic material does not have to comprise iron compounds, but can be comprised of other metal-based ceramics.

Figure 2:
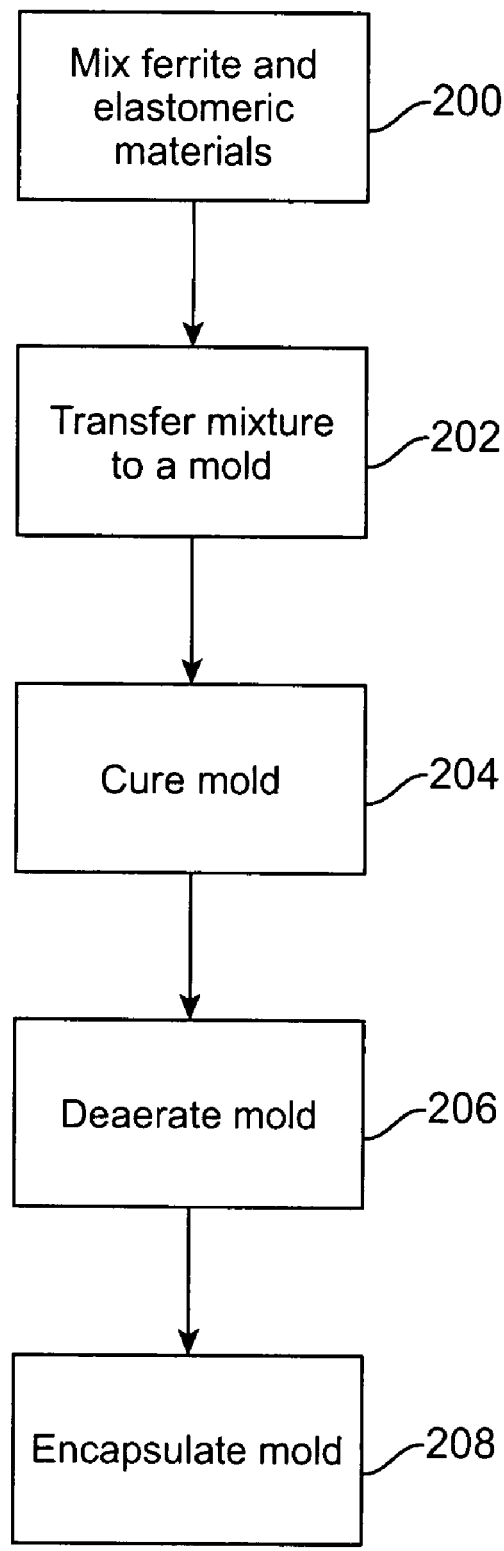
FIG. 2 is a flowchart illustrating an exemplary process of manufacturing the exemplary inductive sensor of FIG. 1.

FIG. 2 illustrates an exemplary method for manufacturing the inductive sensor 100 of FIG. 1.

In a step 200, ferromagnetic materials can be mixed with a liquid elastomeric material to form a ferromagnetic material-elastomer mixture. The ferromagnetic materials can include a blend of various ferromagnetic-based magnetic materials. The materials can be added in various compositions by weight to establish a desired hardness composition of the rubber matrix, and which determine various parameters and characteristics of the inductive sensor 100, such as an inductance value, for example.

The liquid elastomeric material can include any of a number of known elastomers, such as amorphous polymers or other silicone-based materials as desired.

In a step 202, the ferromagnetic material-elastomer mixture is transferred to a mold, such as a ring, cylinder, or any other suitable shape mold as desired. In step 204, the ferromagnetic material-elastomer mixture in the mold is cured at any suitable temperature (e.g., room temperature or greater), to form an inductive structure. The curing temperature is determined by the material composition of ferromagnetic material-elastomer mixture. The curing temperature can be determined by whether the elastomer is a saturated or unsaturated material. For example, saturated elastomers, such as silicones, fluoroelastomers (e.g., Viton®), and perfluoroelastomers (e.g., Kalrez®) can be cured at room temperature absent a catalyst or curing agent for vulcanization. Unsaturated materials, such as polyisoprene (e.g., butyl rubber) and polybutadiene (e.g., nitrile), for example, can require the introduction of a curing agent such as sulfur to promote vulcanization. Based on the material composition of the elastomeric materials, the inductive sensor 100 can be made compatible with temperatures up to 400° F., or greater.

In a step 206, the inductive structure can be deaerated to remove bubbles. Deaerating enables the expansion of the inductive mold to be controlled and reproducible. One of ordinary skill in the art will recognize that any known deaerating technique or process can be used.

If the inductive sensor 100 is to be used in an environment in which contamination may be present, then the inductive sensor 100 can be configured to include a protective coating and/or mounted in a protective casing. In a step 208, the inductive mold can be encapsulated with a protective material such as Teflon®, for example, and/or encapsulated in a vessel, formed as a cylinder, or any other suitable encapsulating means as desired. One of ordinary skill will appreciate that the disclosed method can be performed by a machine.

Figure 3:
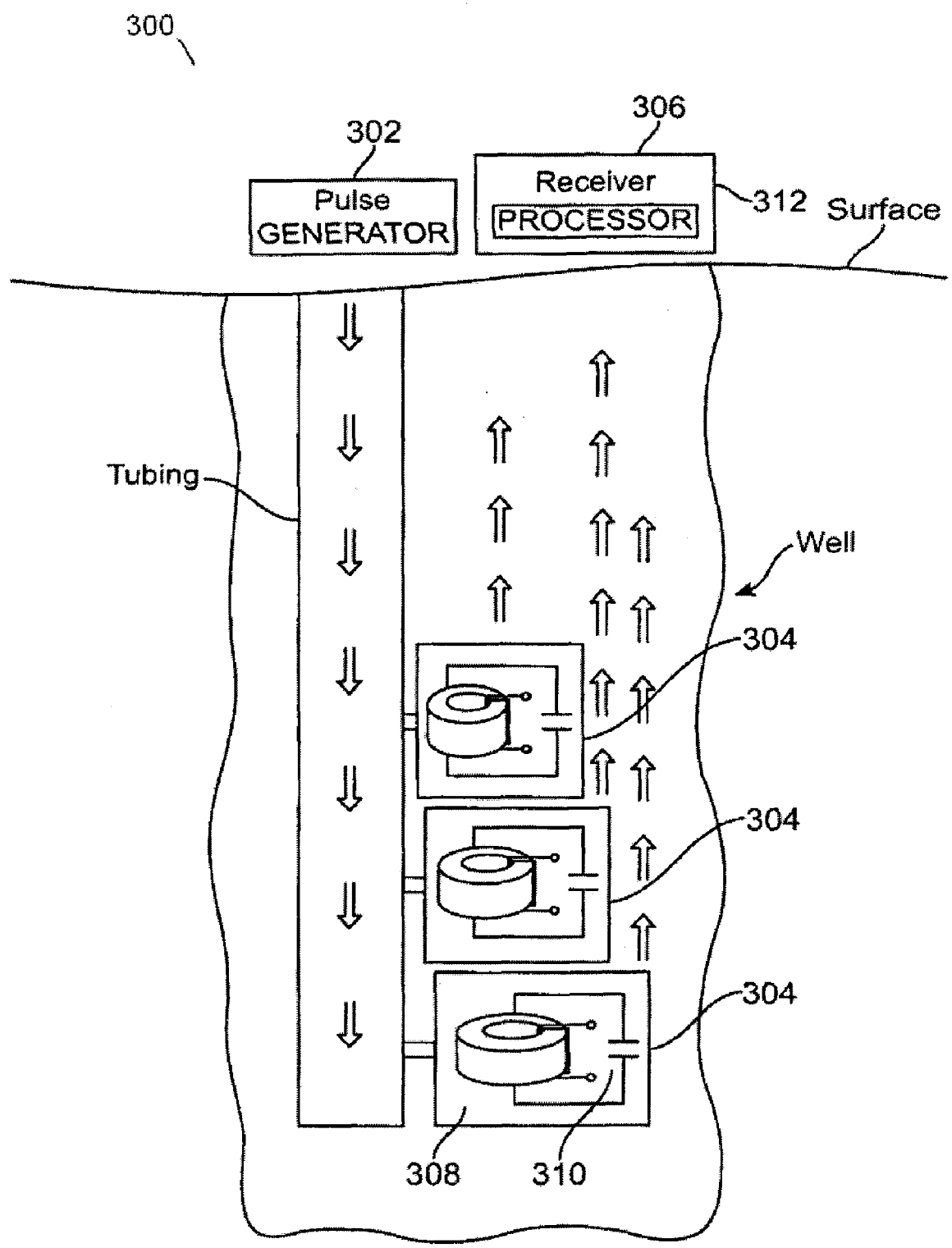
FIG. 3 shows an exemplary system for sensing pressure in a well.

FIG. 3 shows an exemplary system 300 for sensing pressure in a well using the exemplary inductive sensor. The exemplary system 300 can be a telemetry system as described in U.S. patent application Ser. No. 11/394,186 filed Mar. 31, 2006, and additional details regarding such a telemetry system can be found in that application, the contents of which are hereby incorporated in their entirety by reference.

The telemetry system 300 includes means, such as a signal generator 302, for generating electromagnetic (EM) energy and applying the EM energy to a transmission means (not shown), such as a borehole casing or production tubing. The signal generator 302 can generate the EM energy as a pulse (e.g., a sequence or series of pulses or chirps), or as a continuous wave. The EM energy can be generated in a range defined between a desired low resolution (e.g., 1 pulse/sec) and a desired high resolution (e.g., 20 kHz or greater) signals. Modulating means, such as one or more downhole transducers 304, are coupled to the production tubing for interacting with and modulating at least some of the EM energy of the pulse at a "ring frequency." Receiving means, such as a receiver 306 located at or near the surface, receives the EM energy that is reflected by the transducer 304 at the ring frequency. The receiver 306 samples the EM energy at a rate much higher than either of the ring frequency or the frequency of the EM energy so that the original signal can be reproduced.

In embodiments wherein the EM energy is in the form of an EM pulse, an EM pulse generator is used. Non-nuclear means for generating EM pulses are well-known to those in the nuclear-weapons community. Such EM pulse generators are typically used to test electronic devices by simulating EM pulses associated with nuclear blasts. See, e.g., U.S. Pat. No. 3,562,741 (McEvoy et al.); U.S. Pat. No. 4,430,577 (Bouquet); U.S. Pat. No. 4,845,378 (Garbe et al.); and U.S. Pat. No. 5,150,067 (McMillan).

As shown in FIG. 3, the one or more transducers 304 can include an inductive element 308, such as the inductive sensor 100, and a capacitive element 310. The inductive sensor 100 can be configured to sense a characteristic, e.g. pressure, of the well through an observed range of compression, and modulate the frequency of the EM energy based on the compression. The capacitive element 310 is coupled to the inductive element 308 to form a tank circuit. The capacitive element 310 can be configured to be less sensitive to temperature and pressure than the inductive element 308.

When the telemetry system 300 is configured to include multiple transducers 304, each transducer 304 can be configured to operate at a different "ring" frequency. For example, each transducer 304 can include an inductive element 308 having different formulations (i.e. composition by weight, percentage weight) of ferromagnetic material, which result in varying sensitivities to pressure across the multiple transducers 304.

The receiver 306 can include processing means, such as a processor 312. Those of ordinary skill in the art will appreciate that the processor 312 can be implemented as a computer or other suitable hardware and/or software processing means as desired. Prior to placing the transducer 304 into the well, the modulating (ring) frequency of the transducer 304 can be calibrated using a graphical user interface (GUI) associated with the processor 312. As a result, the processor 312 can be configured to store information (e.g., look-up tables, files, and/or databases) that correlate various ring frequency values to observed compression ranges of the inductive element 308.

Figure 4:
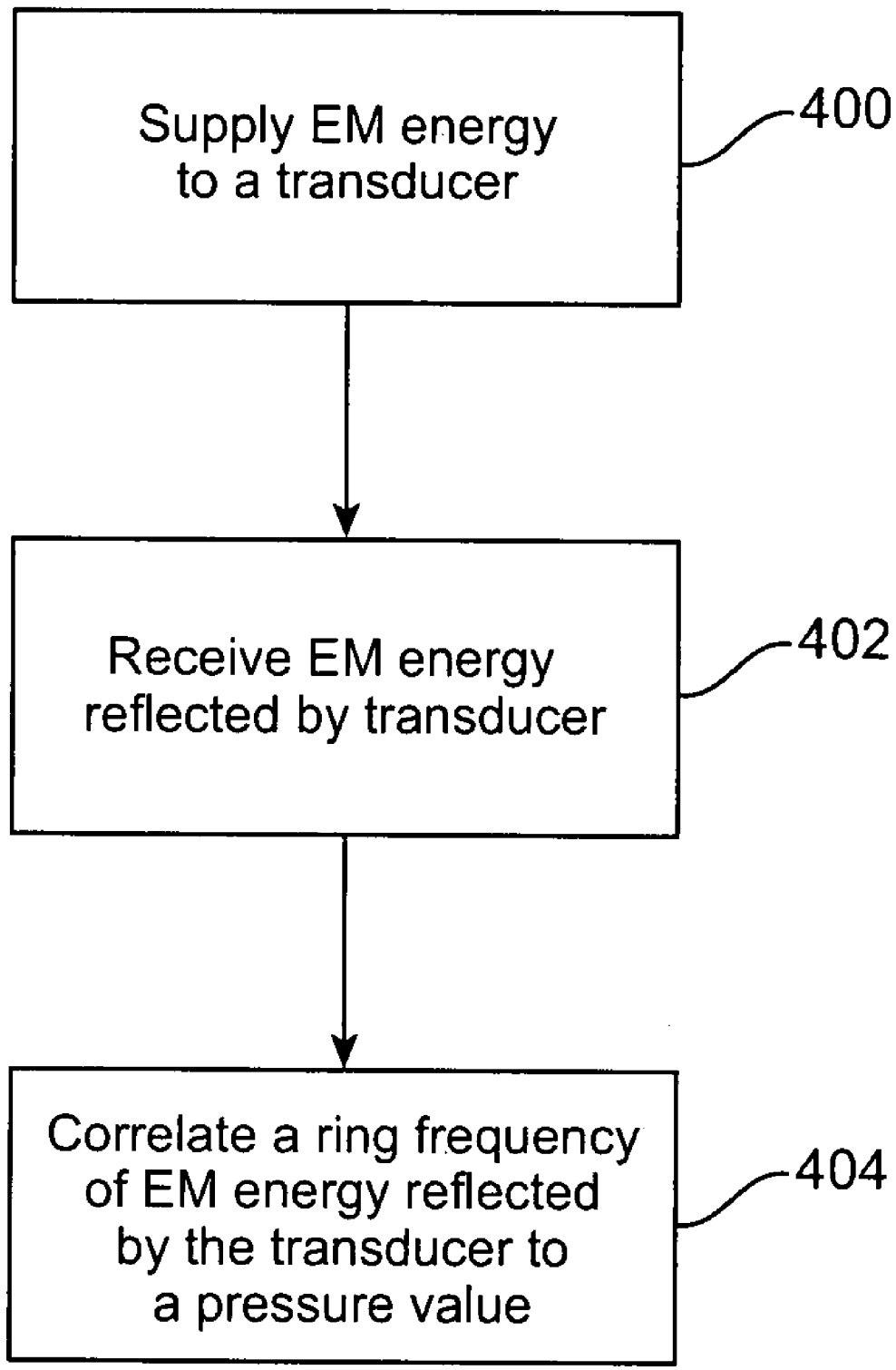
FIG. 4 is a flowchart illustrating an exemplary process of sensing pressure in a well.

FIG. 4 is a flowchart illustrating an exemplary process of sensing pressure using a transducer including the exemplary inductive element 100 in connection with the telemetry system 300. In a step 400, the pulse generator 302 generates EM energy and supplies the EM energy to the transducer 304 via the production tubing. The transducer 304, being coupled to the production tubing, interacts with the EM energy and reflects the EM energy at a ring frequency determined by the inductive element 308 of the transducer 304.

The inductance of the inductive element 308 can vary based on a degree to which the inductive element is compressed by the observed pressure in the borehole. In a step 402, the receiver 306 receives the reflected EM energy. Based on the prior calibration, the processor 312 of the receiver 306 uses means, such as a look-up table, for correlating the ring frequency of the received EM energy to a pressure value (step 404). For example, the processor 312 determines an inductance value of the inductive element 308 based on the ring frequency of the transducer 304. The processor 312 correlates the inductance value of the inductive element 308 to a degree of compression of the inductive element 308. The processor 312 then associates the compression of the inductive element 308 to the pressure in the well.

Figure 5:
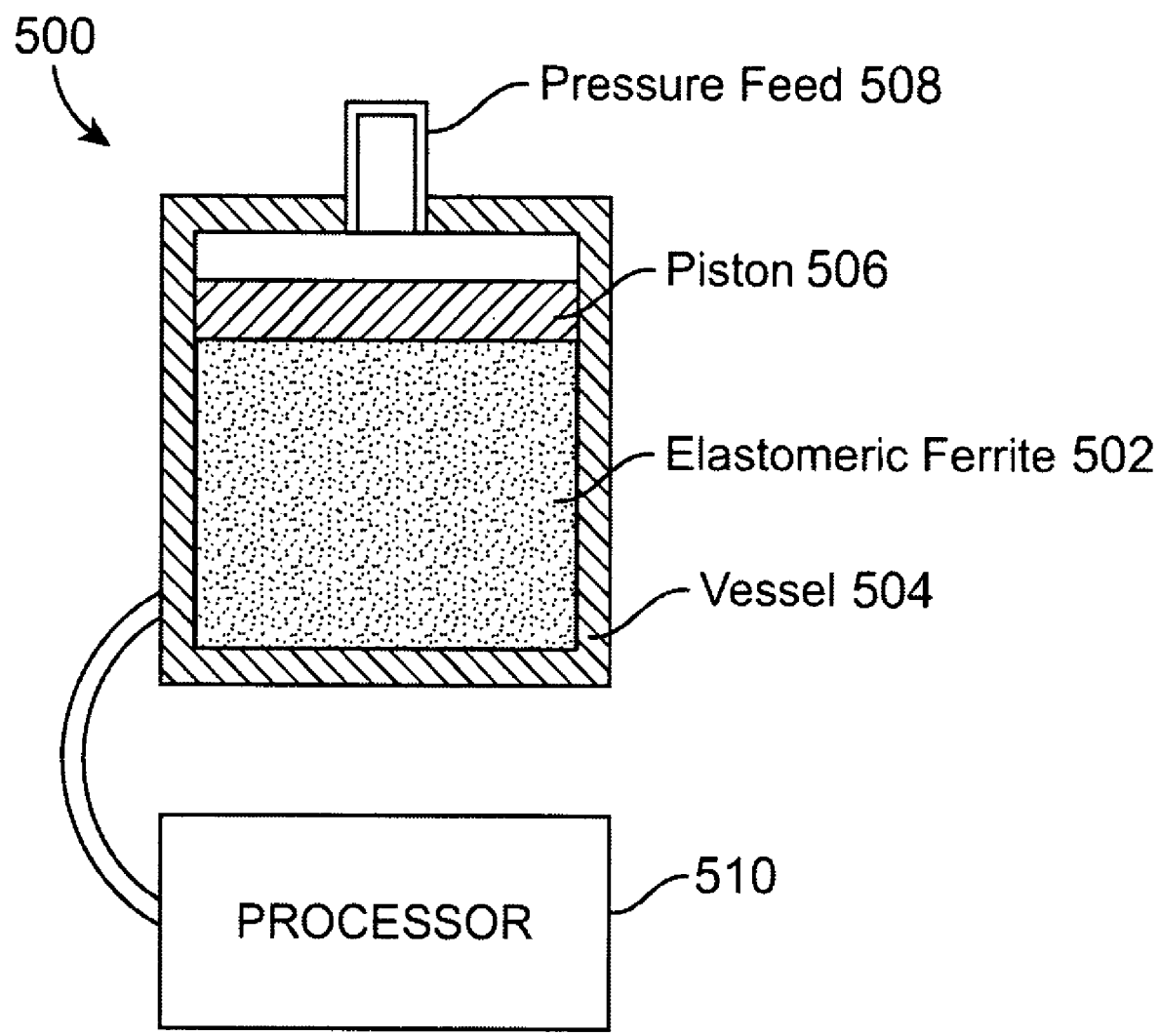
FIG. 5 is a flowchart illustrating a system for sensing pressure in a compressible vessel.

FIG. 5 shows an exemplary device 500 having an inductive sensor 502 mounted in a housing. As shown in FIG. 5, the inductive sensor 502 is encapsulated within a vessel 504. The inductive sensor 500 can be configured to include the physical properties and characteristics as described with respect to the inductive sensor 100 of FIG. 1. The inductive sensor 500 can also be configured in any shape determined by the vessel 500 and/or a shape suitable to achieving the desired response within the vessel 504. The vessel 504 also includes a load-bearing element 506, such as a piston, and a port 508 for applying a load or force to the load-bearing element 506. A processor 510 can be connected to the vessel to compute the pressure in the vessel based on the inductance of the inductive sensor 502.

Figure 6:
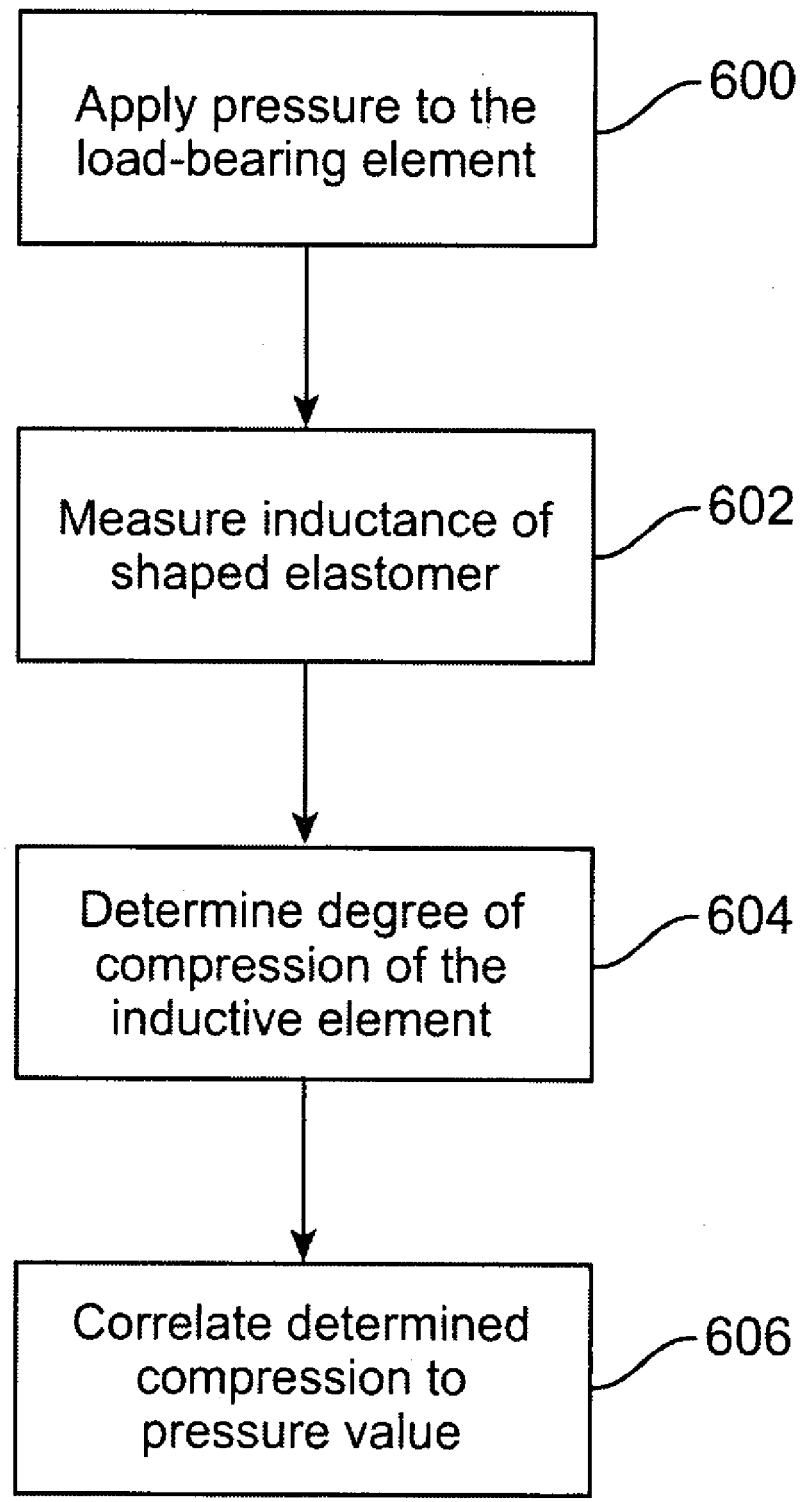
FIG. 6 shows an exemplary inductive sensor and housing for sensing pressure.

FIG. 6 is a flowchart illustrating a method for sensing pressure using the inductive sensor 502 of FIG. 5. In a step 600, pressure is applied to a load-bearing element 506, e.g. piston, of the vessel so that the inductive element 502 is compressed. In a step 602, the processor 510 monitors and records a measurement of an inductance of the inductive sensor 502. In a step 604, the processor 510 determines an observed degree of compression of the inductive sensor 502 based on the measured inductance of the inductive sensor 502. The processor 510 correlates the determined compression to the pressure in the vessel 500 (step 506).

While the invention has been described with reference to specific embodiments, this description is merely representative of the invention by way of example only and is not to be construed as limiting the invention, as numerous variations will exist. Various modifications and applications may occur to those skilled in the art without departing from the true spirit and scope of the invention as defined by the appended claims.

What is claimed is:

1. A sensing device, comprising:
 a vessel, the vessel comprising:
 a port;
 a shaped elastomer that conforms at least in part to a shape of the vessel;
 ferromagnetic material embedded as discrete particles within the shaped elastomer, wherein a percentage by weight of the ferromagnetic particles is selected such that an inductance of the shaped elastomer will vary a predetermined amount for a given compression of the shaped elastomer; and
 a load-bearing element disposed between the shaped elastomer and the port.

2. The sensing device of claim 1, further comprising:
 a capacitive element coupled to the shaped elastomer.

3. The sensing device of claim 2, wherein the capacitive element is less sensitive to temperature and pressure than the shaped elastomer.

4. The device of claim 2, wherein the shaped elastomer and the capacitive element comprise a tank circuit.

\* \* \* \* \*